3,278,561
HYDROPHOBIC DIGLYCIDYLAMINES
Van R. Gaertner, Ballwin, Mo., assignor to Monsanto Company, a corporation of Delaware
No Drawing. Filed June 15, 1962, Ser. No. 202,724
3 Claims. (Cl. 260—348)

This invention relates to hydrophobic diglycidylamines and compositions thereof. In one aspect, this invention relates to alkyl-, alkenyl- and alkyl-substituted aryl diglycidylamines having at least 10 carbon atoms in the aliphatic moieties, and mineral acid salts thereof, as new compounds. In another aspect, this invention relates to improved methods for preparing hydrophobic alkyl-, alkenyl- and alkyl-substituted aryl diglycidylamines. In another aspect, this invention relates to polysaccharide derivatives, including starch and cellulose derivatives, of hydrophobic alkyl-, alkenyl- and alkaryldiglycidylamines. In another aspect, this invention relates to methods for sizing paper with hydrophobic alkyl-, alkenyl- and alkaryl-diglycidylamines, and the paper so produced. In another aspect, this invention relates to methods for rendering textile materials water repellent by contact with hydrophobic alkyl-, alkenyl- and alkaryldiglycidylamines, and the textile materials so produced.

The polysaccharides, such as starches and cellulose, are found in many everyday products, including paper and textile filaments, fibers, yarns, and fabrics. It is very often desirable to improve the liquid penetration resistance characteristics of many of these materials, for example, by treating paper with a sizing agent and textiles with a water-repellent agent. The best agents for this purpose are compounds which are chemically bound to the hydroxyl groups of the polysaccharides so as to be permanently attached to the polysaccharide molecule. At least a portion of the molecule of these agents must also be hydrophobic if high water repellency is to be achieved.

Certain mono- and diglycidylamines have been reported in the literature. Unfortunately, these known compounds are not hydrophobic and, therefore, are not suitable for treating paper and textiles for the purpose of reducing liquid penetration and absorption. Such diglycidylamines have been prepared by condensing one mole of a primary amine with two moles of epichlorohydrin and then dehydrochlorinating the chloropropanol formed with a dehydrochlorinating agent as illustrated by the following equations wherein aniline is the primary amine and sodium hydroxide is the dehydrochlorinating agent:

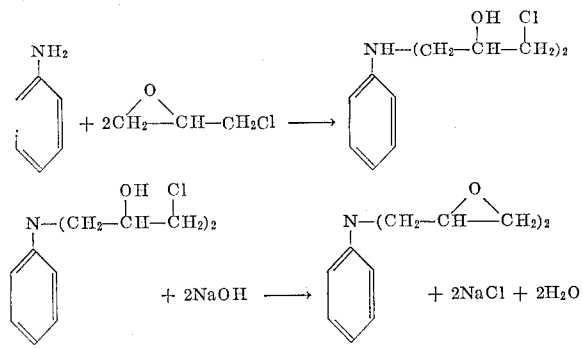

Attempts have been made to use the same reactions to prepare hydrophobic diglycidylamines from primary amines having long-chain alkyl groups; however, such attempts have heretofore always resulted in failure because these diglycidylamines are readily homopolymerizable in the presence of traces of alkali and previously have not been separated and recovered in monomeric form. The diglycidylamine polymers, even if hydrophobic, are not useful in treating polysaccharides to impart liquid resistant properties because such polymers are not reactive with the hydroxyl radicals of the polysaccharides. Therefore, it is necessary that the hydrophobic diglycidylamines be recovered primarily in monomeric form for use in treating polysaccharides.

I have discovered that hydrophobic diglycidylamines having high glycidyl contents are produced in good yield from long chain primary alkyl-, alkenyl-amines or alkyl-substituted anilines and an epihalohydrin at low temperature to form a reaction product having the formula

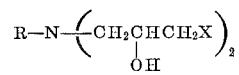

wherein R is selected from the group consisting of alkyl and alkenyl radicals having at least 10 carbon atoms, preferably up to 25 carbon atoms, and alkyl-substituted aryl radicals having a total of at least 10 carbon atoms in the alkyl subtituents, X is a halogen selected from the group consisting of bromine, chlorine, and iodine, derived from the epihalohydrin used, in the presence of at least a trace amount of hydroxyl-containing material, which serves to initiate or catalyze the reaction, contacting and mixing this resulting intermediate product with an aqueous basic material such as an alkali metal or alkaline earth metal oxide, hydroxide or carbonate, including a bicarbonate, in an amount sufficient to dehydrohalogenate said intermediate product in the presence of a dialkyl sulfoxide having from 1 to 4 carbon atoms in each alkyl radical, and then removing any excess basic material from the reaction mixture.

An object of this invention is to provide methods for preparing hydrophobic diglycidylamines.

Another object of this invention is to provide methods for preparing hydrophobic N,N-diglycidylamines having long chain alkyl, alkenyl, or alkyl-substituted aryl radicals bonded to the nitrogen atoms.

Another object of this invention is to provide hydrophobic N,N-diglycidylamines having bonded to the nitrogen atom an alkyl or alkenyl group of at least 10 carbon atoms, or an alkyl-substituted aryl group having at least 10 carbon atoms in the alkyl substituents as new compounds.

Another object of this invention is to provide polysaccharide derivatives, including starch and cellulose derivatives, of the alkyl, alkenyl, and alkyl-substituted aryl N,N-diglycidylamines as new compounds.

Another object of this invention is to provide methods for sizing paper without reducing the tensile strength of the paper.

Another object of this invention is to provide methods for rendering textile materials water-repellent in an improved manner.

Other aspects, objects, and advantages of this invention will be apparent from a consideration of the accompanying disclosure and the appended claims.

In accordance with the first step of the process of this invention primary amines having the formula $$R-NH_2$$

wherein R is an alkyl or an alkenyl radical having at least 10 carbon atoms, preferably from 10 to 25 carbon atoms, or an alkyl-substituted aryl radical having at least 10 carbon atoms in the alkyl substituents is condensed in a first reaction step with an epihalohydrin such as epichlorohydrin, epibromohydrin, or epiiodohydrin in an amount sufficient to form a reaction product of the formula

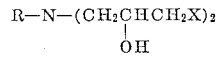

The epihalohydrin is used in an amount which is at least stoichiometrically sufficient to replace both hydrogen atoms from the primary amine nitrogen atom, and is preferably used in excess to obtain complete reaction in reasonable times. The reaction is conducted in the presence of at least a trace amount of an hydroxyl-containing material, preferably a low molecular weight, volatile alkanol, such as methanol, ethanol, or propanol, which can be used as solvent for the reaction mixture as well as the reaction initiator. The hydroxyl-containing material needed to start the reaction can be supplied in a variety of ways. For example, the small amount of water normally present in some commercially available solvents, such as hexane, heptane, etc. is sufficient to initiate the reaction. However, water is not generally desired as a solvent for this reaction mixture. The hydroxyl-containing material can also be supplied by some of the reaction product of this first step, since as indicated above, this product contains an hydroxyl group. The hydroxyl-containing material can also be any other hydroxyl compound, a few simple examples of which are phenol, alkylene glycols such as ethylene glycol, propylene glycol, etc. The provision of the hydroxyl-containing material to initiate the reaction is critical in the sense that in its absence the reaction between the epihalohydrin and the long chained alkyl, alkenyl, or alkyl-substituted aryl primary amine does not take place. For example, attempts to conduct the reaction using dry hexane as solvent resulted in no product being obtained. However, for most purposes, the small amount of hydroxyl-containing material needed to initiate the reaction can be supplied by any source such as are indicated above with no other requirements as to type, amount, etc. being critical. Solvents which can generally be used for this step of the process include the hydrocarbons which are relatively low-boiling, readily volatilizable solvents having molecular weights no higher than those approximating hexane, heptane, etc. as well as the lower molecular weight alkanols, such as methanol, ethanol, propanol, isopropanol, butanol, tert-butanol, pentanols, hexanol, and mixtures thereof.

The reaction is conducted at low temperatures, generally, on the order of from 0° C. to 50° C. at atmospheric pressure. Time periods ranging from 1 to 48 hours are generally sufficient to afford time for complete reaction of 2 molar proportions of epihalohydrin with 1 molar proportion of the primary amine. Specific time periods within this range can be optimized by those skilled in the art and will vary depending upon the reactants chosen, the solvent, the molar proportions of the reactants, the temperature used, etc. When the reaction is complete any excess epihalohydrin together with most of any diluent or solvent used is removed at low temperatures not above 50° C., from the reaction product, preferably by distilling or flashing off of said materials under reduced pressure. It is not essential to remove all of any diluent or solvent, but it is preferred to remove substantially all of the excess epihalohydrin.

When the first step (step A) of the process of this invention is completed and any excess epihalohydrin and most of the diluent or solvent has been removed, the residue which is the reaction product of the first step is contacted with an aqueous basic material to dehydrohalogenate the reaction product of (step A) in the presence of a dialkyl sulfoxide (step B). The aqueous basic material is generally the oxide, hydroxide, carbonate or bicarbonate of an alkali metal or alkaline earth metal admixed with water to provide an efficient working basic material. Examples of such basic materials include sodium, potassium, lithium calcium, barium, strontium, and magnesium oxides, hydroxides, carbonates, and bicarbonates. Most prefered examples are the plentiful, inexpensive basic materials such as sodium hydroxide, potassium hydroxide, sodium and potassium bicarbonates, calcium and magnesium oxides, and mixtures thereof. Aqueous solutions and suspensions of such materials in dilute or concentrated form can be used. Generally concentrations of the basic material on the order of 0.1 to 15 N can be used, with concentrations on the order of those equivalent to 10% to 50%, by weight, being preferred. To effect the desired dehydrohalogenation of the reaction product of the first step, in an economically efficient manner the basic material is preferably used in excess molar proportions, although stoichiometric proportions may be used. The reaction of this second step of the process involving the reaction of the basic material with the reaction product of the first step of the process is conducted in the presence of a substantial amount of a dialkyl sulfoxide.

While the use of a dialkyl sulfoxide is not essential when dehydrohalogenating the reaction product of epihalohydrin with a lower alkylamine or with aniline, I have found that to effect substantially complete dehydrohalogenation of an hydrophobic alkyl, alkenyl, or alkyl-substituted arylaminobis(halopropanol) in reasonable time and yield a dialkyl sulfoxide is an invaluable aid and I consider it essential to any economical process for preparing the compounds of this invention.

I have found that using a dialkyl sulfoxide in this step of the process effects the obtaining of higher yields of product and makes it possible to separate purer products from the resulting reaction mixture. Quantities of dialkyl sulfoxides which may be used range from about 10% to large excesses by weight, based on the weight of the reaction product of the first step which is to be dehydrohalogenated. Preferred quantities of dialkyl sulfoxides are those approximating the weight amounts of the products to be dehydrohalogenated, say, about 90% to 110% based on the weight of the material to be dehydrohalogenated. Examples of dialkyl sulfoxides which may be used are dimethyl sulfoxide, diethyl sulfoxide, dipropyl sulfoxide, diisopropyl sulfoxide, dibutyl sulfoxide, methyl ethyl sulfoxide, ethyl propyl sulfoxide, etc., with dimethyl sulfoxide being preferred. I have found that in the presence of a dialkyl sulfoxide, best results are obtained by employing a slight stoichiometric excess of the basic material say, from about 2.2 to 3.0 moles of the basic material per mole of the intermediate aminobis(chloropropanol) at ordinary, moderately decreased, or moderately increased temperatures, e.g., at temperatures of from −10 to 80° C. at atmospheric pressure. External heating need not be employed, although for efficient reaction, e.g., when reaction is conducted using dilute aqueous basic material or in the presence of a small excess of basic material, say, below 25%, it may be desired to operate at moderately elevated temperatures while agitating the reaction mixture for a time of a few minutes to several hours to insure complete reaction.

The reasons for the effectiveness of a dialkyl sulfoxide in this step of the process are not established, but I believe it to be due to the fact that it promotes complete dehydrohalogenation, avoiding hydroxyl-containing impurities which may initiate polymerization. In any event, with its use I have been able to obtain higher yields and more readily separable reaction products.

When the dehydrohalogenation reaction is completed the excess basic material and dialkyl sulfoxide are removed (step C). Most of both materials are removed from the N,N-diglycidylalkyl, -alkenyl, or alkyl-substituted aryl amine product by merely separating the resulting aqueous layer from the organic layer. The excess basic material can also be removed by adding an acid material such as a mineral acid in sufficient amount to neutralize the excess basic material. Additional quantities of unreacted basic material are also removed by adding to the organic layer a quantity of a clarifying absorbant or adsorbant material, such as charcoal, which is acid acting. I prefer to use a combination of such means of base removal. For example, acid material, such as hydrochloric acid, sulfuric acid, and other mineral acids may be added to the reaction mixture to partially neutralize unreacted basic material before the aqueous phase is separated from the organic phase. Separation of the aqueous and organic phases also removes a large amount of any unreacted base. Then adding a clarifying agent, such as charcoal, to the organic layer removes any remaining basic material from the product.

The primary amines used in preparing the compounds of this invention have long-chained alkyl, alkenyl, and alkyl-substituted aryl radicals which comprise the hydrophobic portion of the molecule. The alkyl and alkenyl radicals have at least 10 carbon atoms which may be in straight chain or branched chain arrangement and may have any greater number of carbon atoms as desired. Ordinarily the number of carbon atoms will not exceed about 25 in number. The alkyl-substituted aryl primary amines have at least 10 carbon atoms in the alkyl substituents. The alkyl substituents on the aryl moiety of the amine may be singular or several, that is, the alkyl substituents may be mono- or di-substituted on the aryl nucleus. The total number of carbon atoms must exceed 10 but will generally not exceed about 25 carbons. The aryl moiety or nucleus of these aromatic amines is generally a monocyclic phenyl ring but may be a dicyclic aryl group such as naphthyl, biphenylyl, etc. The primary amines may be obtained from natural or synthetic sources.

Examples of N,N-diglycidylalkylamines obtained by reacting a primary alkylamine with an epihalohydrin as defined above and the amines from which they are obtained are:

N,N-bis(2,3-epoxypropyl)decylamine from decylamine;
N,N-bis(2,3-epoxypropyl)-n-tridecylamine obtained from n-tridecylamine;
N,N-bis(2,3-epoxypropyl)-n-pentadecylamine obtained from n-pentadecylamine;
N,N-bis(2,3-epoxypropyl)-tert-hexadecylamine obtained from tert-hexadecylamine;
N,N-bis(2,3-epoxypropyl)-n-heptadecylamine obtained from n-heptadecylamine;
N,N-bis(2,3-epoxypropyl)-n-eicosylamine obtained from n-eicosylamine;
N,N-bis(2,3-epoxypropyl)-tert-docosylamine obtained from tert-docosylamine; and
N,N-bis(2,3-epoxypropyl)-n-tetracosylamine obtained from n-tetracosylamine.

Examples of hydrophobic N,N-diglycidylalkenylamines obtained by reacting a primary alkenylamine with an epihalohydrin as defined above are:

N,N-bis(2,3-epoxypropyl)-n-decenylamine obtained from n-decenylamine;
N,N-bis(2,3-epoxypropyl)undecenylamine obtained from undecenylamine;
N,N-bis(2,3-epoxypropyl)-7-hexadecenylamine obtained from 7-hexadecenylamine;
N,N-bis(2,3-epoxypropyl)-9-octadecenylamine obtained from 9-octadecenylamine;
N,N-bis(2,3-epoxypropyl)-sec-heneicosenylamine obtained from sec-heneicosenylamine; and
N,N-bis(2,3-epoxypropyl)-tert-tricosenylamine obtained from tert-tricosenylamine.

Mixtures of alkyl and alkenyl primary amines are likewise useful for preparing compounds of this invention. The primary alkyl amines are often derived from the respective alkenylamines by reduction of the unsaturated bond of the alkenyl group. Mixtures of primary alkyl and alkenyl amines having carbon chains of varying length, provided that the amines have hydrophobic groups, may also be used. Examples of products obtained by reacting an epihalohydrin with primary amine mixtures of the above types are: a mixture of N,N-bis(2,3-epoxypropyl)-n-octadecyl-and -n-octadecenylamines obtained from a mixture of n-octadecyl and n-octadecenylamines; a mixture of N,N-bis(2,3-epoxypropyl)-n-hexadecyl-n-hexadecenyl-n-octadecyl-, and -n-octadecenylamines obtained from a mixture of n-hexadecyl-, n-hexadecenyl-, n-octadecyl-, and n-octadecenyl primary amines; and a mixture of N,N-bis(2,3-epoxypropyl)alkyl ($C_{20}$–$C_{22}$) amines obtained from a mixture of primary alkyl ($C_{20}$–$C_{22}$) amines;

Examples of products of this invention obtained by reacting an ar-alkylaniline with an epihalohydrin according to the process described above are:

N,N-bis(2,3-epoxypropyl)-4-decylaniline obtained from 4-decylaniline;
N,N-bis(2-3-epoxypropyl)-2-methyl-4-undecylaniline obtained from 2-methyl-4-undecylaniline;
N,N-bis(2,3-epoxypropyl)-4-tridecylaniline obtained from 4-tridecylaniline;
N,N-bis(2,3-epoxypropyl)-3-hexadecylnaphthylamine obtained from 3-hexadecylnaphthylamine;
N,N-bis(2,3-epoxypropyl) - 2 - nonadecylaniline obtained from 2-nonadecylaniline;
N,N-bis(2,3-epoxypropyl) - 3,5 - dinonylaniline obtained from 3,5-dinonylaniline;
N,N,-bis(2,3-epoxypropyl) - 4 - eicosylaniline obtained from 4-eicosylaniline; and
N,N-bis(2,3-epoxypropyl) - 4 - docosylbiphenylylamine obtained from 4-docosylbiphenylamine.

The compounds of this invention are useful for a variety of agricultural and industrial purposes. They are useful biological toxicant materials, being particularly useful as fungicides and growth inhibitors of plant virus organisms. For example the, N,N-bis(2,3-epoxypropyl)-n-dodecylamine inhibited growth of tobacco mosaic virus at a concentration of $10^{-4}$ molar to 43% of the control with no inhibitor added. These compounds are also useful for modifying the properties of polysaccharides such as starch, and cellulosic products of various types including paper products, raw natural cellulosic materials such as cotton, and various textile materials including cellulose containing filaments, fibers, yarns, and fabrics.

These materials are particularly valuable because they provide good permanent sizing and waterproofing properties that are not removed from the starch or cellulosic substrate by washing. This enhanced sizing and waterproofing effect is believed to be due to the fact that the diglycidylamines react with the hydroxyl groups of the starch or cellulosic substrate, for example, when applied as the paper product is being made, and effectively crosslink the cellulosic fibers to provide the desired enhanced property.

When the compounds of this invention are applied to cellulosic paper products to provide sized paper products, the compounds may be applied to the paper product according to any technique known to those skilled in the art. For example, the compounds may be applied to finished paper stocks directly, in solution, in emulsion, or otherwise dispersed form. However, for best results it is preferred to apply, admix, or react the presently claimed compounds with the cellulosic paper stock in the pulp preparation stage in media providing a pH of at least 7, preferably 9 to 11, before the pulp is formed into paper sheets, boards, etc. In this manner the sizing of the paper stocks with these compounds is most efficient and effective at low concentrations. Concentrations of the sizing agent range from 0.01% to 5.0% by weight, based on the weight of the finished paper product are generally sufficient to provide a permanently sized paper product. Concentrations on the order of 0.1 to 1.0% by weight, of the sizing agent, that is, the alkyl, alkenyl, or alkyl-substituted aryl diglycidylamine are preferred.

When the diglycidylamines are treated with mineral acids, e.g., hydrochloric, sulfuric, and phosphorus acids, the amino group of the diglycidyl group first neutralizes the acid, say, at a pH of greater than 4. If more acid is added to create a condition of higher acidity, i.e., lower pH, e.g., at a pH of less than 3 the acid adds to the epoxide groups. Such mineral acid salts of the diglycidylamine are water soluble and need not be emulsified. This salt form of the product also stabilizes them against polymerization so that the diglycidylamines may be stored for some time before they are used, e.g., as paper-sizing or textile treating agents. For example, these mineral acid diglycidylamine salts may be added as such directly to paper pulp and neutralized inherently in the basic pH pulp medium.

A variety of pulps may be treated with the compounds described above and used to make permanently sized paper according to this invention including bleached and unbleached sulfite pulp, bleached and unbleached kraft pulp, soda pulp, hardwood pulp, and mixtures of ground wood pulp with unbleached kraft pulp and other pulps.

The waterproofing of textile materials is accomplished according to this invention by impregnating the cellulosic textile material comprising cellulose filaments, fibers, fabrics with a solution of the alkyl, alkenyl, or alkyl-substituted aryl diglycidylamine compound in an appropriate solvent at a basic pH and then volatilizing off the solvent, for example, by drying and curing, and thereafter subjecting the treated material to elevated temperatures to produce a substantially water insoluble finish on the cellulosic textile. The textile material may be impregnated with the diglycidylamine compound in solutions of from 0.01% to 5% by weight of the diglycidylamine. The total amount of diglycidylamine impregnated into the textile material is usually at least 0.075% by weight.

The compositions may be applied to the textile materials in various ways so long as impregnation of the textile materials is obtained. For example, the textile materials may be dipped or immersed in the composition or the composition may be dripped or sprayed on the textile material until the textile material is wetted out with the composition. In order to facilitate the control of deposition of the alkyl, alkenyl, and alkyl-substituted aryl diglycidylamine compounds of this invention on the textile material and reduce the drying time, it is desirable to extract the textile material to remove excess solution therefrom. This is suitably accomplished by padding, wringing, squeezing, or hydroextracting the textile material. The amount of diglycidylamine compound applied to the textile material is controlled by the degree of extraction used and/or the concentration of these materials in the solution, and may be varied widely depending on the amount of water repellency desired in the textile material. In general, the amount of such ingredients applied is between about 0.01 and 5% by weight, based on the dry textile material, but good practical water repellent effects are obtained on most textiles by applying from about 0.5% to 2% by weight based on the dry textile material.

After the compounds have been applied, in solution, the textile material may then be dried at normal drying temperatures and finally heated at elevated temperatures of about 250 to 360° F. to obtain a water-repellent finish on the textile material. The temperature may be higher than 360° F. depending on the particular textile material, the type and amount of catalyst and the duration of heating is limited only by the stability of the textile material. The duration of heating may vary widely depending primarily on the liquid content and the temperature used but is generally between about 1 and 15 minutes with the longer times corresponding to the lower temperatures. The textile material thus obtained may be given the usual finishing operation such as a refinish wash to remove water-soluble materials, steam framing and the like. Such operations may be desirable, but are not essential.

A large variety of textile materials comprising cellulose fibers may be treated in accordance with the processes of this invention, but the textile material should contain at least 40% by weight of cellulose fibers and probably 60% by weight or more of cellulose fibers. The textile materials treated may be woven or knitted fabrics, referred to generally as fabrics or yarns, filaments or fibers, but it is preferred to treat fabrics. The cellulose fibers may be natural cellulose fibers such as cotton, linen, flax or ramie fibers or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon.

The compounds described above are incorporated into cellulosic substrates in various manners, usually in the form of organic solutions or aqueous emulsions which are prepared according to techniques known in the art. The aqueous emulsions containing one or more of the above described compounds is usually accomplished with one or more of various types of cationic, anionic, or nonionic emulsifying agents which are known in the art. The solutions and aqueous emulsions of the above compounds may also contain other papermaking or textile auxiliaries such as stiffening or bodying agents, softening agents, curing agents, wetting agents, antifoaming agents, and the like, but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkyl acrylates, polyalkyl methacrylates, vinyl chloride, vinyl acetate copolymers and the like and/or water-soluble thermoplastic resins such as polyvinyl alcohol; water-soluble partially hydrolyzed polyvinyl acetates; water-soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers; or the like. Generally such agents are employed in amounts of about 0.05 to 5% by weight of the composition.

As examples of softening agents may be mentioned water-soluble alkali metal and ammonium salts of sulfonated mineral oils, sulfonated fatty alcohols such as sulfonated cetyl and stearyl alcohol, sulfonated castor oil and the like; water-soluble or water-dispersible polyethylene oxides of high molecular weight; the water-soluble reaction products of ethylene oxide or propylene oxide with aryl and aralkyl alcohols or with esters of a fatty acid and sorbitan and the like; cationic type softeners such as cetyldimethylbenzylammonium chloride and the quaternary ammonium salts of diethylaminoethyl oleyl amide hydroacetate, or the like. Generally such agents are employed in amounts of 0.05 to 5% by weight of the composition.

As examples of wetting agents which may be used may be mentioned sodium salts of alkylated benzene sulfonates such as sodium decyl benzene sulfonate, sodium dodecyl benzene sulfonate; sodium lauryl sulfate; the sodium salt of methyl stearamide ethionic acid; dioctyl sodium sulfosuccinate; and the like. In general, such agents are employed in amounts of about 0.05 to 3% by weight of the composition.

As examples of anti-foaming agents may be mentioned water-insoluble silicone compounds, water-insoluble oils, water-insoluble alcohols and the like. The amount of such agent used varies with its effectiveness in minimizing foaming, but, in general, amounts of about 0.1 to 5% by weight of the composition may be employed.

*Example 1*

To a solution of 92.7 g. (0.5 mole) of n-dodecylamine in 250 ml. of hexane, cooled to 10°–15° C. there was added 139 g. (1.5 moles) of epichlorohydrin at a rapid dropwise rate. The solution was allowed to warm slowly in a 20° C. water bath and stirred for 16 hours. The final temperature of the mixture was 24° C. The reaction mixture was then warmed to 30°–35° C. under aspirator vacuum and then under pump vacuum to 0.1 mm. to remove the hexane solvent and excess unreacted epichlorohydrin, leaving 187.6 g. (101% of theory) of a light yellow oily product, $n_D^{25}$ 1.4783. A 111.2 g. fraction of the oily product was treated with a mixture of 150 ml. of hexane, 100 ml. of dimethylsulfoxide, 100 ml. of water, and then 100 g. of a 40% aqueous sodium hydroxide solution was added to effect dehydrohalogenation of the product. The mixture was stirred for 1 hour at 25°–30° C., after which time the sodium hydroxide treated reaction mixture was titrated with 6 N hydrochloric acid until a thymolphthalein blue indicator color was discharged. The oily layer was then separated, washed with saturated sodium chloride solution, and dried using sodium sulfate, ether extraction, and finally magnesium sulfate as drying agent. The liquid product was aspirated to 30° C. leaving 83.6 g. of crude bis(2,3-epoxypropyl)dodecylamine, $n_D^{25}$ 1.4620; a distilled sample, B.P. 162°–163° C./0.05–0.1 mm., $n_D^{25}$ 1.4589, analyzing as containing 9.82% oxygen, as compared with a calculated oxygen content of 10.75% (Ross method); another sample (B.P. 160–163° C./0.1 mm.) contained 72.52% carbon, 12.17% H, and 4.93% nitrogen compared with calculated values of 72.7% carbon, 11.85% hydrogen, and 4.71% nitrogen.

*Example 2*

To a solution of 107.8 g. (0.4 mole) of n-octadecylamine in 250 ml. of hexane, cooled to 25° C., there was added 92.5 g. (1.0 mole–50% excess) of epichlorohydrin using water bath cooling to maintain the temperature of the mixture at 25° C. The mixture was stirred for a total of 40 hours as the temperature was raised to 44° C. to effect complete reaction. The reaction mixture was cooled to 25° C. and filtered to remove 2–3 g. of white solid. The filtrate weighed 367.9 g. To a 200 g. portion of this filtrate there was added 70 g. of 40% aqueous sodium hydroxide at a dropwise rate in 20 minutes at 30° C. (water-bath cooling) after adding 70 ml. of dimethyl sulfoxide and 30 ml. of water. The mixture was then stirred for an hour, neutralized to a pH of about 8 with 6 N hydrochloric acid with cooling below 30° C. The hexane-product layer was separated from the aqueous layer, dried with sodium sulfate, filtered, concentrated to 30° C., redissolved in acetone, filtered, and concentrated to leave as crude residue N,N-bis(2,3-epoxypropyl)-n-octadecylamine as an off-white solid, crystallization point 31°–30° C., 74 g., which analyzed as containing 5.53% oxirane oxygen as compared with a calculated oxirane oxygen content of 8.38%. A distilled sample of the product, B.P. 196°–216° C./0.1 mm. $n_D^{25}$ 1.4614 (supercooled) analyzed as containing 6.73% oxirane oxygen (80.3% of theory) by the Ross method, and crystallized at 26–25° C. Another sample B.P. 211° C./0.1 mm., $n_D^{25}$ 1.4622, contained 75.22% carbon, 12.17% hydrogen, and 4.71% nitrogen compared to 75.5% carbon, 12.42% hydrogen, 3.67% nitrogen calculated for $C_{24}H_{47}NO_2$.

*Example 3*

To a mixture of 88.5 g. of a commercially available mixture of $C_{20}$–$C_{22}$ primary amines (specified to be 97% primary amines, average molecular weight 295, iodine value 5 maximum) and 500 ml. of hexane, heated to 55°–60° C. to clear turbidity, and rapidly cooled to 35° C. there was added 64.8 g. (0.7 mole) of epichlorohydrin. The mixture was stirred for 25.5 hours at 25° initially and finally up to 45° C., and then filtered at 30° using a filter aid with some loss of insoluble material. The filtrate was concentrated finally to 75° C./0.1 mm. to remove hexane and excess epichlorohydrin leaving 113.8 g. of oily residue which solidifies to a waxy solid at about 46° C. To 52.4 g. of this residue dissolved in 100 ml. hexane with mild heating, and cooled to 25° C., there was added 20 g. of aqueous 40% sodium hydroxide, 20 ml. of water, and 50 ml. of dimethyl sulfoxide. The mixture was stirred for 90 minutes and extracted with hexane. The hexane layer was dried overnight over magnesium sulfate, filtered and concentrated to 70° C./20 mm., leaving 37.9 g. of a near-white oil, which solidified on cooling, crude $C_{20-22}$-n-alkyldiglycidylamine. If the average molecular weight is taken as 295 for the amine, this material has a molecular weight of 407.1, (0.0931 mole if pure), for an 85.2% yield, of product. Glycidyl content was 34% of theory (Ross). Modification of the dehydrohalogenation step by neutralizing the excess sodium hydroxide with 6 N-hydrochloric acid to a pH of 7, and then separating, drying, filtering and aspirating as above, greatly improved the glycidyl oxygen (oxirane) content of the product as indicated by an oxirane oxygen analysis of 4.48% found as compared with 7.85%, the calculated value for

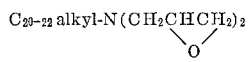

Thus the purity of the product was increased from 34% to 57%.

*Example 4*

To 90 g. (0.20 mole) of a commercially available mixed secondary amine ("dicocoamine") of the formula $R_2NH$ (specified to contain $C_8$—8%, $C_{10}$—9%, $C_{12}$—47%, $C_{14}$—18%, $C_{16}$—8%, $C_{18}$—10%) having an approximate combining weight of 450, of which 85% was secondary amine, M.P. approximately 46° C., melted and dissolved in 200 ml. of hexane at 35° C., then cooled to 20–25° C., there was added 37.0 g. (0.40 mole) of epichlorohydrin in portions with cooling at 20°–25° C. The mixture was stirred for 66 hours at 20–32°. A small precipitate was filtered off, and the filtrate was concentrated to 30° C./0.5 mm. with stirring, leaving 108 g. of an oil, $n_D^{25}$ 1.4631. To a 48.8 g. portion of this product, dissolved in 100 ml. of hexane, there was added a mixture of 50 ml. of dimethyl sulfoxide, 20 g. of 40% aqueous sodium hydroxide, and 20 ml. of water, rapidly at 25° C. The mixture was stirred for 1 hour at 20°–25° C. The hexane product layer was separated from the aqueous layer, and the hexane layer was washed with saturated sodium chloride solution twice, dried over sodium sulfate-magnesium sulfate, and filtered. The filtrate was treated with 3–4 drops of acetic acid and concentrated, first under aspirator vacuum and finally to 30° C./1 mm. The product, 42.0 g. (92.2% crude yield), was partly crystalline at room temperature; $n_D^{25}$ 1.4582 (supercooled).

A sample redried at 30°/0.1 mm. contained an average of 3.65% oxirane oxygen compared with 3.16% calculated for pure didodecylglycidylamine, $C_{27}H_{54}NO$. This product was tested for sizing activity to compare its effectiveness for such purpose with the compounds of the present invention in the same test. The results are given in Example 7.

*Example 5*

This example illustrates the effectiveness of a dialkyl sulfoxide in the dehydrohalogenation step for the preparation of N,N-diglycidyl-tert-dodecylaniline.

To a solution of 78.5 g. (0.30 mole) of a commercial grade tert-dodecylaniline, B.P. 119–145° C./0.1 mm., dissolved in 250 ml. of Skellysolve F (a mixture of low boiling hydrocarbons, B.P. 30°–60° C.) there was added at once 64.8 g. (0.7 mole) of epichlorohydrin. No exothermic reaction was observed on heating the mixture for 3 hours at 35° C. The temperature was raised to reflux (49° C.) and the heating was continued for 66 hours, during which time the reflux temperature rose to 58° C. The viscous mixture was concentrated under vacuum, finally to 55° C./0.1 mm. leaving 135 g. of very viscous yellow oil.

To determine the effect of dimethyl sulfoxide on the dehydrohalogenation step which follows, two parallel runs were made, one with and one without dimethyl sulfoxide, using 3 equivalents of sodium hydroxide for each run, a maximum of 50% excess sodium hydroxide. Hexane was added to both runs for fluidity at 25° C.

A. To a 37.2 g. (0.0825 mole) portion of the above product dissolved in 50 ml. of dimethyl sulfoxide and 50 ml. of hexane with the aid of a shaker, there was added 25 g. of 40% sodium hydroxide solution mixed with 25 ml. of water, in portions. After stirring the mixture for 85 minutes to insure complete reaction the oil layer was separated from the aqueous layer, and the oil layer was washed with saturated sodium chloride solution, dried with magnesium sulfate, filtered, and distilled to obtain 24.9 g. of N,N-bis-(2,3-epoxypropyl)-tert-dodecylaniline, B.P. 186–217° C./0.05 mm., $n_D^{25}$ 1.5201, for a conversion of 80.7%. The product analyzed as follows for

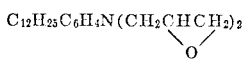

| | Anal. Calcd. for $C_{24}H_{39}NO_2$ | Found |
|---|---|---|
| Percent C | 77.2 | 76.11 |
| Percent H | 10.52 | 10.20 |
| Percent N | 3.75 | 4.11 |
| Percent O (oxirane) | 8.56 | [1] 8.05 |

[1] Ross, modified.

B. To 30.5 g. (0.675 equivalent) of the same residual adduct dissolved in 50 ml. of hexane alone and at 25° C., 20.3 g. of 40% sodium hydroxide plus 20 ml. of water was added. The mixture was stirred for 85 minutes to insure complete reaction as in "A" above. The mixture had turned to a soupy gel. Additional hexane (30 ml.) was added to liquify the mixture and it was stirred for 10 minutes longer. The layers were separated and the hexane-product layer was washed with saturated sodium chloride three times. The oil layer was dried with magnesium sulfate as above, filtered, and distilled. There was obtained 15.3 g. of product, $n_D^{25}$ 1.5188, B.P. 197–212°–205° C./0.2–0.1 mm., a 60.7% conversion.

Thus, if these figures represent a non-initiating polymeric by-product, the use of dimethylsulfoxide in the solvent medium gives at least a 33% better conversion. This is a conservative figure as an average; higher alkyl-diglycidylamines are much more sensitive to impurities which may initiate polymerization than this diglycidyl-alkylaniline. In some of the former cases sudden exothermic polymerization has been observed during distillation when a dialkyl sulfoxide had not been used or when alkali removal had been incomplete.

*Example 6*

This example illustrates that the beneficial effect of using dimethyl sulfoxide as a solvent for the dehydrohalogenation step is not observed in preparing diglycidyl derivatives of lower molecular weight amines.

To a solution of 46.9 g. (0.5 mole) of aniline diluted in 100 ml. of hexane, there was added 139 g. (1.50 mole) of epichlorohydrin at 20° C. The mixture was warmed to 56°–65° C. and stirred for 21 hours. The reaction mixture was concentrated to 70° C./0.1 mm. leaving 145.4 g. of clear amber oil, $n_D^{25}$ 1.5701.

Two identical dehydrohalogenation runs were made on 27.8 g. (0.10 mole) portions of the above residue except that in run 1 the residue was dissolved in 30 ml. of dimethyl sulfoxide and in run 2 no dimethyl sulfoxide was used. Each run was treated with 30 g. (50% excess) of 40% aqueous sodium hydroxide in 30 ml. of water under 35° C. In run 1 (dimethyl sulfoxide run) rapid separation of sodium chloride occurred and a fluid colorless oil resulted. In run 2 heating to 60° C. and stirring for 2 hours was required. In each run the oil layer was separated, extracted into ether, washed twice with water, dried with magnesium sulfate, filtered and distilled. In run 1 the total yield was 17.1 g. (0.0834 mole), 83.4%. In run 2 the total yield was 17.4 g. (0.0848 mole), 84.8%. In run 1 the main fraction (15.9 g.) had a B.P. 130–134/0.1 mm., $n_D^{25}$ 1.5624. In run 2 the main fraction (15.2 g.) had a B.P. 132–136° C./0.2 mm., $n_D^{25}$ 1.5623. It can be seen from these comparative data that dimethyl sulfoxide had no effect on the yields of this diglycidylated lower molecular weight amine, N,N-diglycidylaniline.

*Example 7*

Each of the following three compounds were applied to cellulose and evaluated for their effect as sizing agents.
(1) Diglycidyl-n-octadecylamine
(2) Dicocoglycidylamine
(3) (Dicocoamino)chloropropanol Each of the three compounds were applied in the following manner:

Dissolve 1.80 g. of the compound to be evaluated in 24 ml. of xylene. Dissolve 80 mg. of hexadecyltrimethylammonium bromide, an emulsifying agent, in 400 ml. of water. Prepare an emulsion of the compound by mixing 4 ml. of the xylene solution of the compound and 40 ml. of the aqueous solution of hexadecyltrimethylammonium bromide in a Waring Blendor, running at full speed, for three minutes.

Prepare a 2% aqueous slurry of bleached Gatineau sulfite pulp, and then adjust the pH of the pulp slurry to 9.0 using dilute caustic. Add 1.5 liters of this pulp slurry to a 2 quart stainless steel beaker. Position the beaker under a Mixmaster adjusted to have a beater speed of 300 r.p.m. Start the Mixmaster and immediately add all of the compound emulsion prepared above. Stir the pulp for five (5) minutes, stop the stirring and allow the treated pulp to stand at room temperature for 2.5 hours. At the end of this time period, make standard handsheets in the Noble and Wood handsheet machine. The paper thus prepared is conditioned overnight at 72° F. and 50% relative humidity (RH). After conditioning, the paper is evaluated for sizing as follows:

Two or more 1 x 2 inch pieces of the paper are heated for 90 minutes at 120° C. After reconditioning at 72° F. and 50% RH, sizing is measured as above.

When sizing is obtained a piece of the cured papers is washed in about 15 ml. of chloroform for 1 hour. At the end of this time, the paper is air dried, reconditioned at 72° F. and 50% RH and sizing is again measured.

The comparative test results were as follows:

| Test | Compound | | |
|---|---|---|---|
| | 1 | 2 | 3 |
| | Time in seconds | | |
| Cure 90 minutes/120° C | 9,000 | 900 | 150 |
| Chloroform wash | 7,000 | 750 | 25 |

The data shows the diglycidyl-n-octadecylamine (1) to be about 10 times as effective as a paper sizing agent as the monoglycidylamine (2) even though the latter had hydrophobic groups totalling approximately 24 carbon atoms as compared with the 18-carbon hydrophobic group in (1). This data also shows the great degree of permanent sizing which remains after the wash step as compared to the references (2) and (3).

When hand sheets were prepared in the same manner from a 2% slurry of Gatineau bleached sulfite wood pulp which had not been modified in the above-described manner were tested, the sheets showed instantaneous wetting when tested by the ink penetration method.

*Example 8*

Paper sizing tests similar to those described in Example 7 on N,N-bis(2,3-epoxypropyl)dodecylaniline, as follows:
A. 0.35% solution of N,N-bis(2,3-epoxypropyl)-dodecylaniline in 200 ml. of toluene was prepared using a small amount of diethylenetriamine ("Dabco") as catalyst. Into this solution test strips of Whatman #1 filter paper were dipped and dried in air. The treated paper strips were cured for 60 minutes at 105° C. and then tested on the ink penetration test as described about to determine the time in seconds it takes for ink to wet the paper. Other samples of the treated paper were washed in chloroform overnight and subjected to the same ink penetration test.

The results were as follows:

| Test: | Seconds |
|---|---|
| Cured 60 min./105° C. | 550 |
| Chloroform washed | 2000 |
| Control | 0 |

Another test of the same compound was run as follows:

A 0.30 g. sample of the compound was dissolved in 4 ml. of 50:50 (volumetric) chloroform-trichloroethane mixture (1.0% solution) and emulsified with 10 ml. of 0.02% hexadecyltrimethylammonium bromide. Using "Dabco" as a catalyst, the mixture was applied to paper pulp having a pH of 9.05, the water pH 9, the resulting treated pulp was formed into paper, the paper cured at 105° C. for 60 minutes and tested by the ink penetration method, as above. Another sample was washed in chloroform for 1 hour and tested according to the same ink penetration test. A sample of paper pulp containing no test compound but otherwise treated identically was also tested as a control. The results were as follows:

| Test: | Time (seconds) |
|---|---|
| Cured treated pulp | 100 |
| Washed treated pulp | 5500 |
| Control pulp | 0 |

*Example 9*

This example illustrates the effectiveness of the claimed compounds as waterproofing agents.

(1) Diglycidyl-n-octadecylamine
(2) Diglycidyl-alkyl(n-$C_{20}$–$C_{22}$) amine

Desized Indianhead cotton muslin swatches, 7" x 7" were used in the test. A 1% solution of compound (1) was prepared in acetone. A 1% solution of compound (2) was prepared in hexane. The cotton swatches were weighed dry and then reweighed wet (after immersion in the test solution for 3 minutes) to measure the uptake of test chemical. The wet cotton samples were air-dried, and then dried for 10 and 20 minute periods in a circulating heat oven at 150° C. The samples were then conditioned for 4 hours at 65±2% RH and 70°±2° F. After conditioning, the treated swatches were fastened to a metal hoop and 250 ml. of water at 80°±2° F. was poured into a funnel and allowed to spray through a nozzle onto the cloth sample. The samples were then rated according to Standard Spray Test Rating of the Resistance to Wetting (spray test), AATCC Standard Test Method 22–1952, the 1959 Technical Manual of the American Association of Textile Chemists and Colorists. Sample (1) swatches were washed in acetone 3 minutes. Sample (2) swatches were washed in hexane. Both swatches were then dried and rechecked to see if the water-repellent finishes were permanent.

The test results were as follows:

DRY TIME—150° C.—10 MINUTES

| Compound | Weight of Dry Swatches (gm.) | Weight of Wet Swatches (uptake by difference) (gm.) | Standard Spray Test Rating | Wash Test Rating |
|---|---|---|---|---|
| 1 | 5.6604 | 8.2551 | 80 | Acetone/80. |
| 2 | 5.5824 | 7.1567 | 70 | Hexane/70. |

DRY TIME—150° C.—20 MINUTES

| 1 | 5.5882 | 8.3547 | 80 | Acetone/80. |
| 2 | 5.6930 | 7.3256 | 80 | Hexane/80. |

The grams of chemical uptake by the cotton swatches is determined by weight difference. The amount of test chemical which is on the cotton swatch is determined by dividing 1% of the grams uptake by the weight of the dry swatch. For example, the percentage of compound (1) on the first test cotton swatch under the 10 minute dry category was 0.467%. Similarly, the grams of the diglycidyl alkyl ($C_{20}$–$C_{22}$) amine on the cotton swatch in the test compound was 0.281%. The results show that the test compounds were given very high ratings.

I claim:
1. A compound of the formula

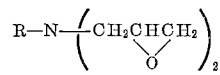

wherein R is an alkyl-substituted phenyl radical having at least 10 carbon atoms in the alkyl substituents.

2. A mineral acid salt of a compound described in claim 1.

3. N,N-bis(2,3-epoxypropyl)-ar-tert-dodecylaniline.

References Cited by the Examiner

UNITED STATES PATENTS

| 2,131,120 | 9/1938 | Schlack | 260—348 |
| 2,252,039 | 8/1941 | Schirm | 260—348 |
| 2,595,935 | 5/1952 | Daniel et al. | 162—164 |
| 2,694,629 | 11/1954 | Reynolds | 260—348 |
| 2,829,071 | 4/1958 | Schroeder | 117—135.5 |
| 2,884,406 | 4/1959 | Wegler et al. | 260—348 XR |
| 2,921,037 | 1/1960 | Andres et al. | 260—2 |
| 2,926,116 | 2/1960 | Keim | 162—164 |
| 2,938,004 | 5/1960 | De Hoff et al. | 260—2 |
| 2,951,822 | 9/1960 | Reinking | 260—348.6 XR |
| 2,965,652 | 12/1960 | Gaertner | 260—348 |
| 3,039,894 | 6/1962 | Raphael et al. | 117—135.5 |
| 3,091,537 | 5/1963 | Burness | 260—348 |

FOREIGN PATENTS

| 1,132,146 | 6/1962 | Germany. |
| 772,830 | 4/1957 | Great Britain. |

WALTER A. MODANCE, *Primary Examiner.*

MORRIS O. WOLK, NICHOLAS S. RIZZO,
*Examiners.*

S. L. BASHORE, N. S. MILESTONE,
*Assistant Examiners.*